United States Patent
Zhu et al.

(10) Patent No.: US 9,581,680 B2
(45) Date of Patent: Feb. 28, 2017

(54) POSITIONING METHOD AND DEVICE FOR DRIVE TEST

(71) Applicant: ZTE Corporation, Shenzhen, Guangdong (CN)

(72) Inventors: Zhenming Zhu, Shenzhen (CN); Qianhua Chen, Shenzhen (CN); Yaoting Tan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/655,669

(22) PCT Filed: Sep. 30, 2013

(86) PCT No.: PCT/CN2013/084799
§ 371 (c)(1),
(2) Date: Jun. 25, 2015

(87) PCT Pub. No.: WO2014/101518
PCT Pub. Date: Jul. 3, 2014

(65) Prior Publication Data
US 2015/0338501 A1    Nov. 26, 2015

(30) Foreign Application Priority Data
Dec. 26, 2012 (CN) .......................... 2012 1 0574115

(51) Int. Cl.
*H04Q 7/10* (2006.01)
*G01S 5/04* (2006.01)
(Continued)

(52) U.S. Cl.
CPC ...... *G01S 5/04* (2013.01); *G01S 5/02* (2013.01); *G01S 5/06* (2013.01); *H04W 4/046* (2013.01); *H04W 24/06* (2013.01); *H04W 24/10* (2013.01)

(58) Field of Classification Search
CPC .... G01S 5/0252; G01S 5/0284; H04W 64/00; H04W 24/10; H04W 24/06; H04W 4/046
(Continued)

(56) References Cited

U.S. PATENT DOCUMENTS 6,711,404 B1 * 3/2004 Arpee .................. H04W 16/18
                                                                   455/423
7,197,013 B2    3/2007 Douglas et al.
(Continued)

FOREIGN PATENT DOCUMENTS

CN       101217760 B    12/2010
CN       101931984 A    12/2010
(Continued)

OTHER PUBLICATIONS

Supplementary European Search Report in European application No. 13869469.0, mailed on Nov. 30, 2015.
(Continued)

*Primary Examiner* — Ajit Patel
*Assistant Examiner* — Julio Perez
(74) *Attorney, Agent, or Firm* — Oppedahl Patent Law Firm LLC (57) ABSTRACT

Provided is a positioning method for a drive test, and the method includes: fixed parking sampling points of a testing vehicle in drive test data are determined; location information of the fixed parking sampling points of the testing vehicle is determined according to serving cell identification information of the fixed parking sampling points of the testing vehicle in the drive test data and information of a route matching the drive test data; and location information of a moving sampling point between the fixed parking sampling points of the testing vehicle in the drive test data is determined according to the information of the route. Further provided is a positioning device for a drive test, and by means of the embodiments of the present disclosure, positioning of sampling points in drive test data can be implemented efficiently and accurately, thus having low cost for implementation.

14 Claims, 2 Drawing Sheets

(51) Int. Cl.
*H04W 24/06* (2009.01)
*H04W 4/04* (2009.01)
*G01S 5/06* (2006.01)
*G01S 5/02* (2010.01)
*H04W 24/10* (2009.01)

(58) Field of Classification Search
USPC .................. 455/456.1–456.3, 456.5–456.6
See application file for complete search history.

(56) References Cited

U.S. PATENT DOCUMENTS

| | | |
|---|---|---|
| 8,150,417 B2 | 4/2012 | Reed |
| 8,849,190 B2 * | 9/2014 | Hanson ............... H04B 7/15535 455/11.1 |
| 2002/0138195 A1 | 9/2002 | Watanabe |
| 2005/0190732 A1 | 9/2005 | Douglas |
| 2009/0209271 A1 | 8/2009 | Reed |
| 2012/0170560 A1 | 7/2012 | Han |

FOREIGN PATENT DOCUMENTS

| | | |
|---|---|---|
| CN | 102547574 A | 7/2012 |
| CN | 102547579 A | 7/2012 |
| WO | 2012138083 A2 | 10/2012 |
| WO | 2012147735 A1 | 11/2012 |

OTHER PUBLICATIONS

International Search Report in international application No. PCT/CN2013/084799, mailed on Jan. 2, 2014.
English Translation of the Written Opinion of the International Search Authority in international application No. PCT/CN2013/084799, mailed on Jan. 2, 2014.

* cited by examiner

POSITIONING METHOD AND DEVICE FOR DRIVE TEST

TECHNICAL FIELD

The present disclosure relates to drive test techniques, and in particular to a positioning method and device for a drive test.

BACKGROUND

In optimization of a wireless network, it is a basic means for estimating quality of the wireless network to perform a drive test on the wireless network. The drive test refers to a test during which different types of calls are performed at different locations of a route using a testing equipment, and during which longitudes, latitudes and wireless network parameters (including network signal strength and quality) of different sampling points are recorded, and during which a drive test trajectory diagram is generated according to longitudes, latitudes and wireless network parameters of all sampling points in the route. In this way, it is possible to check intuitively network signal strength and quality of different sampling points on the route, thus facilitating analysis and optimization of wireless networks.

The metro is a common site where people use wireless networks. Since there are no Global Positioning System (GPS) signals in the metro, longitudes and latitudes of sampling points of the metro route can not be recorded directly. A solution commonly used today lies in that at each station of the metro route, longitudes and latitudes are recorded by manual dotting, based on which longitudes and latitudes of sampling points between stations are determined, thus a drive test trajectory diagram is formed; since manual operations are error-prone, if a testing operator forgets to perform a dotting operation at a station, the drive test needs to be performed again; moreover, a certain operation space is required to perform the manual dotting, thus it is difficult to perform the dotting operation when carriages are crowded during rush hours.

In general, there are so far no effective solutions that can determine conveniently and readily longitudes and latitudes of sampling points on the metro route to form a drive test trajectory diagram.

SUMMARY

In view of the above, embodiments of the present disclosure are intended to provide a positioning method and device for a drive test, which, without a dotting operation during the drive test, can quickly and conveniently determine longitudes and latitudes of sampling points and generate a drive test trajectory diagram, thereby facilitating subsequent analysis and optimization of a network.

To this end, the technical solutions of embodiments of the present disclosure are implemented as follows.

A positioning method for a drive test, applied to positioning in a drive test for rail transit, the method including:

fixed parking sampling points of a testing vehicle in drive test data are determined;

location information of the fixed parking sampling points of the testing vehicle is determined according to serving cell identification information of the fixed parking sampling points of the testing vehicle in the drive test data and information of a route matching the drive test data; and location information of a moving sampling point between the fixed parking sampling points of the testing vehicle in the drive test data is determined according to the information of the route.

In an embodiment, the method may further include that, before the fixed parking sampling points of the testing vehicle in the drive test data are determined, the route matching the drive test data is determined according to the serving cell identification information in the drive test data.

In an embodiment, the step that the route matching the drive test data is determined according to the serving cell identification information in the drive test data may include:

a route where a serving cell identification sequence of fixed parking points matches a serving cell identification sequence in the drive test data is determined as the route matching the drive test data.

In an embodiment, the step that fixed parking sampling points of a testing vehicle in drive test data are determined may include:

sampling points where radio signal delays have an amplitude of variation smaller than a preset threshold among consecutive sampling points having same serving cell identification information in the drive test data are determined as the fixed parking sampling points of the testing vehicle.

In an embodiment, the step that location information of a moving sampling point between the fixed parking sampling points of the testing vehicle in the drive test data is determined according to the information of the route may include:

a serving cell identification sequence of fixed parking points in the information of the route is matched with a serving cell identification sequence of the fixed parking sampling points of the testing vehicle in the drive test data, and location information of the fixed parking points in the information of the route matching the fixed parking sampling points of the testing vehicle in the drive test data is determined as the location information of the fixed parking sampling points of the testing vehicle in the drive test data.

In an embodiment, the step that location information of a moving sampling point between the fixed parking sampling points of the testing vehicle in the drive test data is determined according to the information of the route may include:

the moving sampling point between the fixed parking sampling points of the testing vehicle is mapped to a route segment of the route between fixed parking points matching the fixed parking sampling points of the testing vehicle, and the location information of the moving sampling point is determined according to location information of the route segment in the information of the route.

In an embodiment, the step that the moving sampling point between the fixed parking sampling points of the testing vehicle is mapped to the route segment of the route between the fixed parking points matching the fixed parking sampling points of the testing vehicle may include:

the moving sampling point between the fixed parking sampling points of the testing vehicle is mapped in a equally-spaced way to the route segment of the route between the fixed parking points matching the fixed parking sampling points of the testing vehicle; or the moving sampling point between the fixed parking sampling points of the testing vehicle is mapped in proportion to the route segment of the route between the fixed parking points matching the fixed parking sampling points of the testing vehicle.

An embodiment of the present disclosure further provides a positioning device for a drive test, applied to positioning in a drive test for rail transit, the positioning device for a drive test comprising a fixed parking sampling point determination module, a fixed parking sampling point positioning module and a moving sampling point positioning module, specifically the fixed parking sampling point determination module is configured to determine fixed parking sampling points of a testing vehicle in drive test data;

the fixed parking sampling point positioning module is configured to determine location information of the fixed parking sampling points of the testing vehicle according to serving cell identification information of the fixed parking sampling points of the testing vehicle in the drive test data and information of a route matching the drive test data; and the moving sampling point positioning module is configured to determine location information of a moving sampling point between the fixed parking sampling points of the testing vehicle in the drive test data according to the information of the route.

In an embodiment, the positioning device for a drive test may further include:

a tested route determination module configured to determine the route matching the drive test data according to the serving cell identification information in the drive test data.

In an embodiment, the tested route determination module may be further configured to determine a route, where a serving cell identification sequence of fixed parking points matches a serving cell identification sequence in the drive test data, as the route matching the drive test data.

In an embodiment, the fixed parking sampling point determination module may be further configured to determine, sampling points where radio signal delays have an amplitude of variation smaller than a preset threshold among consecutive sampling points having same serving cell identification information in the drive test data, as the fixed parking sampling points of the testing vehicle.

In an embodiment, the fixed parking sampling point positioning module may be further configured to match a serving cell identification sequence of fixed parking points in the information of the route with a serving cell identification sequence of the fixed parking sampling points of the testing vehicle in the drive test data, and to determine, location information of the fixed parking points in the information of the route matching the fixed parking sampling points of the testing vehicle in the drive test data, as the location information of the fixed parking sampling points of the testing vehicle in the drive test data.

In an embodiment, the moving sampling point positioning module may be further configured to map the moving sampling point between the fixed parking sampling points of the testing vehicle to a route segment of the route between fixed parking points matching the fixed parking sampling points of the testing vehicle, and to determine the location information of the moving sampling point according to location information of the route segment in the information of the route.

In an embodiment, the moving sampling point positioning module may be further configured to:

map, in a equally-spaced way, the moving sampling point between the fixed parking sampling points of the testing vehicle to the route segment of the route between the fixed parking points matching the fixed parking sampling points of the testing vehicle; or map, in proportion, the moving sampling point between the fixed parking sampling points of the testing vehicle to the route segment of the route between the fixed parking points matching the fixed parking sampling points of the testing vehicle.

In technical solutions provided by embodiments of the present disclosure, after a route matching drive test data is determined according to serving cell identification information in the drive test data, location information of parking sampling points of a testing vehicle is determined according to the serving cell identification information of the fixed parking sampling points of the testing vehicle in the drive test data and information of the route matching the drive test data, then location information of moving sampling points between the fixed parking sampling points of the testing vehicle in the drive test data is determined according to the information of the route. In this way, location information of sampling points can be determined without dotting operations during a drive test so that the location information of the sampling points can be combined with wireless network parameters of the sampling points to generate a drive test trajectory diagram, thereby facilitating subsequent analysis and optimization of a network; moreover, the location information of the moving sampling points is determined, with high positioning accuracy, with reference to the fixed parking sampling points in the information of the route: further, no additional devices are required to be added to related testing terminals when the technical solutions according to the embodiments of the present disclosure are applied, thus having low cost for implementation.

DETAILED DESCRIPTION

The present disclosure will be further elaborated below in combination with accompanying drawings and specific embodiments.

Figure 1:
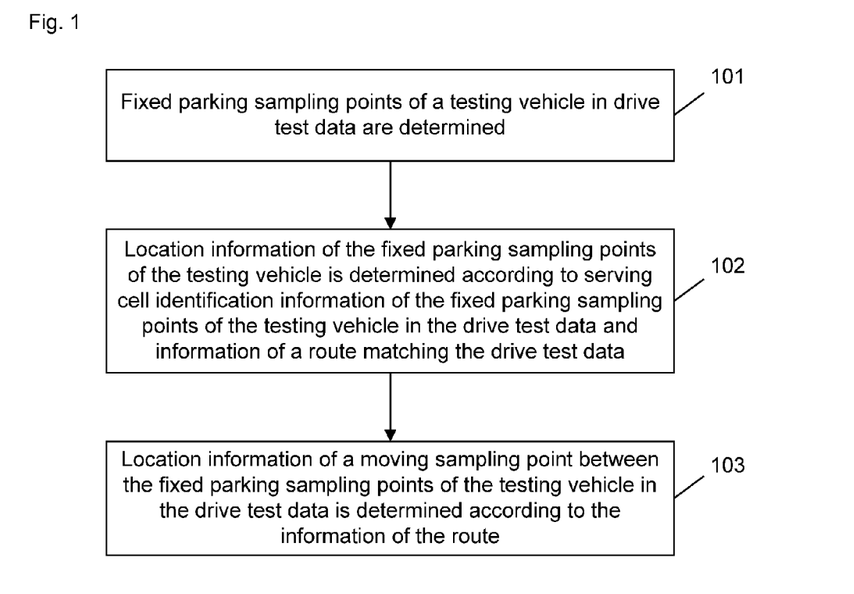
FIG. 1 is a schematic flow chart of a positioning method for a drive test according to an embodiment of the present disclosure.

An embodiment of the present disclosure provides a positioning method for a drive test, and FIG. 1 is a schematic flow chart of the positioning method for a drive test according to the embodiment of the present disclosure, as shown in FIG. 1, the method includes the following steps:

step 101, fixed parking sampling points of a testing vehicle in drive test data are determined.

Before step 101, as a preferred embodiment, radio signal delays and serving cell identification information of the sampling points in the drive test data are parsed. Specifically, the drive test data include radio signal delays of the sampling points and serving cell identification information of the sampling points, and the drive test data further include radio signal quality and strength information of the sampling points.

Specifically, the radio signal delays are a measurement of time taken by radio signals transmitted from a serving cell base station to the testing vehicle, and reflects the distance between the testing vehicle and the serving cell. When the testing vehicle travels towards and thus approaches the serving cell base station, the radio signal delays of the sampling points decrease gradually; accordingly, when the testing vehicle moves away from the serving cell base station, the radio signal delays of the sampling points increase gradually.

Specifically, in order to ensure that when the testing vehicle parks at a fixed parking point, radio signal delay and identification information in a serving cell where the testing vehicle is located can be sampled, it is required that the radio signal delay of and the cycle of the identification information of the serving cell where the testing vehicle is located are shorter than a parking time during which the testing vehicle parks at the fixed parking point, and preferably, the cycle is shorter than 1 second.

As a preferred embodiment of the present disclosure, the step that fixed parking sampling points of a testing vehicle in drive test data are determined may include: sampling points where radio signal delays have an amplitude of variation smaller than a preset threshold among consecutive sampling points having same serving cell identification information in the drive test data are determined as the fixed parking sampling points of the testing vehicle.

Specifically, among the consecutive sampling points having same serving cell identification information, a minimum radio signal delay is selected as a reference value, differences between the reference value and radio signal delays of other consecutive sampling points having same serving cell identification information are calculated as amplitudes of variation of the radio signal delays of the other consecutive sampling points having same serving cell identification information.

Specifically, the amplitudes of variation of the radio signal delays reflect changes in position of the other consecutive sampling points having same serving cell identification information with respect to a sampling point having the minimum radio signal delay, therefore, when the testing vehicle parks at a fixed parking point, a fluctuation amplitude of the radio signal delay of a fixed parking sampling point in the drive test data will not exceed a parking time of the testing vehicle. In this way, if an amplitude of variation of a radio signal delay of a sampling point is smaller than the preset threshold, the sampling point is a fixed parking sampling point.

Before step 101, as a preferred embodiment, information of a route is generated.

Specifically, the information of the route is a model description of the route, and the step that the information of the route is generated includes that location information and serving cell identification information of fixed parking points of the route and location information of track points of the route are set. The location information of the fixed parking points of the route is determined through an electronic map tool, the track points of the route are turning points of the route, the route can be determined through simple connection of the track points by straight lines, and the location information of the track points of the route is determined through an electronic map tool.

When the drive test data are drive test data of two or more routes, and before the fixed parking sampling points of the testing vehicle in the drive test data are determined, as a preferred embodiment, a route matching the drive test data is also determined according to the serving cell identification information in the drive test data, which can be implemented by determining a route, where a serving cell identification sequence of fixed parking points matches a serving cell identification sequence in the drive test data, as the route matching the drive test data.

Step 102 includes that location information of the fixed parking sampling points of the testing vehicle is determined according to serving cell identification information of the fixed parking sampling points of the testing vehicle in the drive test data and information of a route matching the drive test data.

As a preferred implementation of step 102, the serving cell identification sequence of the fixed parking points in the information of the route is matched with a serving cell identification sequence of the fixed parking sampling points of the testing vehicle in the drive test data, and location information of fixed parking points in the information of the route matching the fixed parking sampling points of the testing vehicle in the drive test data is determined as the location information of the fixed parking sampling points of the testing vehicle in drive test data.

Step 103 includes that location information of a moving sampling point between the fixed parking sampling points of the testing vehicle in the drive test data is determined according to the information of the route.

As a preferred implementation of step 103, the moving sampling point between the fixed parking sampling points of the testing vehicle is mapped to a route segment of the route between fixed parking points matching the fixed parking sampling points of the testing vehicle, and the location information of the moving sampling point is determined according to location information of the route segment in the information of the route.

Specifically, the step that the moving sampling point between the fixed parking sampling points of the testing vehicle is mapped to the route segment of the route between the fixed parking points matching the fixed parking sampling points of the testing vehicle may include: the moving sampling point between the fixed parking sampling points of the testing vehicle is mapped in a equally-spaced way to the route segment of the route between the fixed parking points matching the fixed parking sampling points of the testing vehicle; or the moving sampling point between the fixed parking sampling points of the testing vehicle is mapped in proportion to the route segment of the route between the fixed parking points matching the fixed parking sampling points of the testing vehicle.

The proportion is a proportion between radio signal delays of the moving sampling point. A drive test trajectory diagram corresponding to the tested route can be generated according to location information of sampling points on the tested route in combination with wireless network parameters of the sampling points of the tested route.

Figure 2:
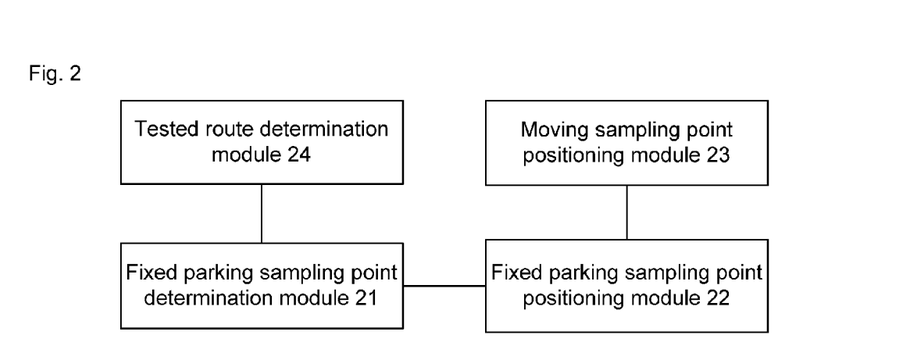
FIG. 2 is a schematic structural diagram of a positioning device for a drive test according to an embodiment of the present disclosure.

An embodiment of the present disclosure further provides a positioning device for a drive test, and FIG. 2 is a schematic structural diagram of a positioning device for a drive test according to an embodiment of the present disclosure, as shown in FIG. 2, the positioning device for a drive test includes a fixed parking sampling point determination module 21, a fixed parking sampling point positioning module 22 and a moving sampling point positioning module 23, specifically the fixed parking sampling point determination module 21 is configured to determine fixed parking sampling points of a testing vehicle in drive test data;

the fixed parking sampling point positioning module 22 is configured to determine location information of the fixed parking sampling points of the testing vehicle according to serving cell identification information of the fixed parking sampling points of the testing vehicle in the drive test data and information of a route matching the drive test data; and the moving sampling point positioning module 23 is configured to determine location information of a moving sampling point between the fixed parking sampling points of the testing vehicle in the drive test data according to the information of the route.

In an embodiment, the positioning device for a drive test may further include a tested route determination module 24 configured to determine the route matching the drive test data according to serving cell identification information in the drive test data.

In an embodiment, the tested route determination module 24 may be further configured to determine, a route where a serving cell identification sequence of fixed parking points matches a serving cell identification sequence in the drive test data, as the route matching the drive test data.

In an embodiment, the fixed parking sampling point determination module 21 may be further configured to determine sampling points, where radio signal delays have an amplitude of variation smaller than a preset threshold, among consecutive sampling points having same serving cell identification information in the drive test data, as the fixed parking sampling points of the testing vehicle.

In an embodiment, the fixed parking sampling point positioning module 22 may be further configured to match the serving cell identification sequence of the fixed parking points in the information of the route with a serving cell identification sequence of the fixed parking sampling points of the testing vehicle in the drive test data, and determine, location information of fixed parking points in the information of the route matching the fixed parking sampling points of the testing vehicle in the drive test data, as the location information of the fixed parking sampling points of the testing vehicle in drive test data.

In an embodiment, the moving sampling point positioning module 23 may be further configured to map the moving sampling point between the fixed parking sampling points of the testing vehicle to a route segment of the route between fixed parking points matching the fixed parking sampling points of the testing vehicle, and determine the location information of the moving sampling point according to location information of the route segment in the information of the route.

In an embodiment, the moving sampling point positioning module 23 may be further configured to:

map, in a equally-spaced way, the moving sampling point between the fixed parking sampling points of the testing vehicle to the route segment of the route between the fixed parking points matching the fixed parking sampling points of the testing vehicle; or map, in proportion, the moving sampling point between the fixed parking sampling points of the testing vehicle to the route segment of the route between the fixed parking points matching the fixed parking sampling points of the testing vehicle.

In practical applications, the fixed parking sampling point determination module 21, the fixed parking sampling point positioning module 22, the moving sampling point positioning module 23 and the tested route determination module 24 may all be implemented by a Central Processing Unit (CPU), a Digital Signal Processor (DSP) or a Field Programmable Gate Array (FPGA) of the positioning device for a drive test.

Figure 3:
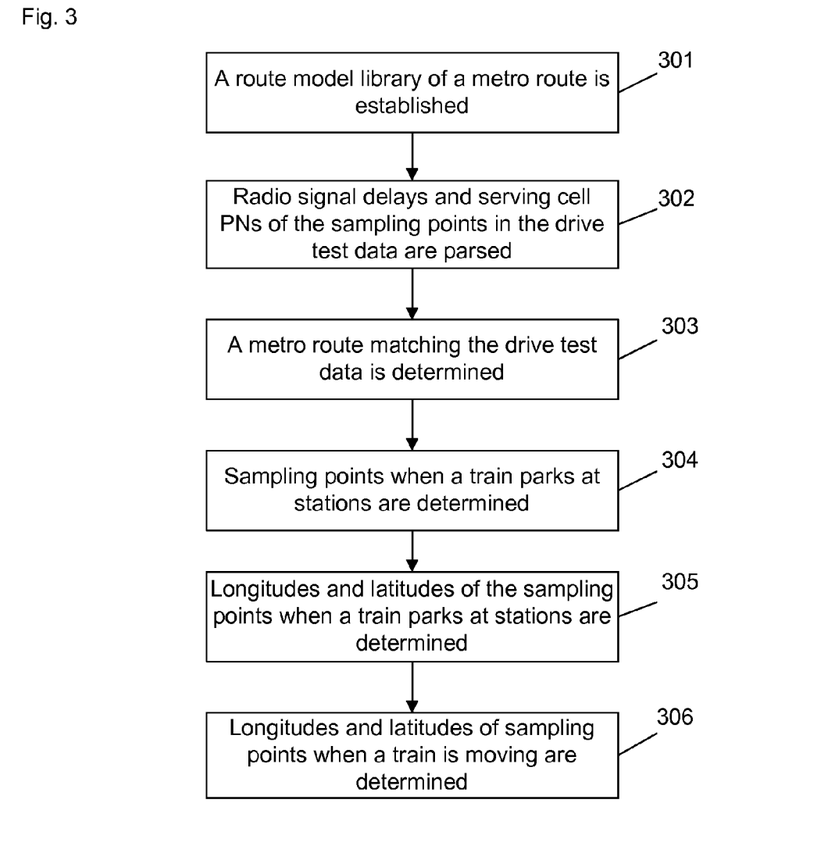
FIG. 3 is a schematic flow chart of implementation of positioning in a drive test according to an embodiment of the present disclosure.

The positioning method for a drive test according to the embodiment of the present disclosure will be further elaborated below by taking, as an example, a scenario where drive test data are collected and generated along a metro route covered by a Code Division Multiple Access (CDMA) 1× network and positioning is performed based on sampling points in the drive test data to generate a drive test trajectory diagram. FIG. 3 is a schematic flow chart of implementation of positioning in a drive test according to an embodiment of the present disclosure, as shown in FIG. 3, below steps are included:

step 301, a route model library of a metro route is established.

The route model library of the metro route is a model description of information of the metro route.

Specifically, the route model library of the metro route includes longitudes and latitudes of stations along the metro route and pseudo-random noise codes (PNs) of serving cells along the metro route. The longitudes and latitudes of the stations along the metro route are acquired through an electronic map, the PNs are acquired through an engineering parameter table provided by an operator or read from radio signal parameters sampled at the sampling points, the information of the metro route may further include names of the stations along the metro route.

The route model library of the metro route further includes a metro route trajectory diagram. The metro route trajectory diagram consists of track points, the track points are portrayed at turning points of the metro route, and longitudes and latitudes of the track points are recorded on an electronic map. The portrayed track points are connected to form the metro route trajectory diagram.

It should be noted that step 301 may also be implemented after step 302.

Step 302 includes that radio signal delays and serving cell PNs of the sampling points in the drive test data are parsed.

In an embodiment, delays of radio signals of a serving cell where a train is located are adopted as the radio signal delays, and PNs of the serving cell where the train is located are adopted as the PNs for identifying the serving cell; in a CDMA 1× network, adjacent serving cells have different PNs which can be used to differentiate a serving cell from its neighbors.

In an embodiment, a delay of a strongest radio signal in the serving cell where the train is located is adopted as the radio signal delays so as to avoid a case where accuracies of subsequent processing are affected by the sampling of radio signal delays of other weak signals due to multi-path transmission of radio signals.

Specifically, in a CDMA 1× network, a radio signal delay is a measurement of a transmission time of radio signals from a serving cell base station to the train, with a unit of ⅛ chip; the radio signal delay reflects a distance between the train and the serving cell base station, and each chip corresponds to a transmission distance of 244 meters, thus an accuracy of positioning of the sampling points corresponds to a transmission distance corresponding to ⅛ chip.

In an embodiment, the drive test data may further include periodically sampled wireless network parameters of serving cells where the train is located.

Step 303 includes that a metro route matching the drive test data is determined.

A PN sequence of serving cells of sampling points in the drive test data is matched with a PN sequence of serving cells of stations on each metro route in the route model library; if they match successfully, the drive test data match the metro route.

For example, if the PN sequence of serving cells of sampling points in the drive test data is PN 1, PN 1, PN 1, PN 2, PN 2, PN 2, PN 3, PN 3, PN 3, PN 4, PN 4, PN 4, i.e., the train passes serving cells having PN 1, PN 2, PN 3 and PN 4 respectively, when there is a metro route whose serving cells of stations are PN 1, PN, PN 3, PN 4 in the route model library, then the drive test data match the metro route.

It should be noted that the processing of the step applies also to a case when drive test data are matched with multiple metro routes.

For example, if the PN sequence of serving cells of sampling points in the drive test data is PN 1, PN 1, PN 1, PN 2, PN 2, PN 2, PN 3, PN 3, PN 3, PN 4, PN 4, PN 5, PN 5, i.e., the train passes serving cells having PN 1, PN 2, PN 3, PN 4 and PN 5 respectively, when there is a metro route 1 whose serving cells of stations are PN 1, PN, PN 3, PN 4, and PN5 in the route model library, then the PN 1, PN 1, PN 1, PN 2, PN 2, PN 2, PN 3, PN 3, PN 3 in the PN sequence of serving cells of sampling points in the drive test data matches with PN 1, PN 2, PN 3 of the PN sequence of serving cells of stations of metro route 1 in the route model library, and if a station corresponding to PN 3 is a station transferred to a metro route 2 and a PN sequence of serving cells of stations of metro route 2 in the route model library is PN 5, PN 5, PN 4, PN 4, PN 3, PN 3, PN 7, PN 7, PN 6, then subsequent PN 4, PN 4, PN5, PN 5 in the PN sequence of serving cells of sampling points in the drive test data match a PN sequence PN 5, PN 5, PN 4, PN 4 on the side of PN 3 in the PN sequence of serving cells of stations of metro route 2 in the route model library, i.e., the drive test data match metro route 1 and metro route 2.

It should be noted that due to the randomness of radio signals, some PN may appear repeatedly in a PN sequence of serving cells of sampling points in the drive test data. For example, when a train moves from a serving cell PN 1 to a serving cell PN 2, it may firstly receive radio signals from the serving cell PN 1 and then receive signals from the serving cell PN 2, and later it may again receive radio signals from the serving cell PN 1, and thereafter receive, all the time, radio signals from the serving cell PN 2; in addition, some segments of a metro route are in the open air, thus the train may receive radio signals from cells on the ground.

Therefore, in the PN sequence of serving cells of sampling points in the drive test data, when there is a repeated PN during an operation time between two stations, it means that a previous occurrence of the PN in the PN sequence of serving cells is resulted from a random interference or a fact that the train was traveling on a segment in the open air. Accordingly, after a PN in the PN sequence of serving cells of sampling points in the drive test data matches with a PN in a PN sequence of a metro route in the route model library, when in an operation time between two stations, a PN in the PN sequence of serving cells of sampling points in the drive test data matches a next PN in the PN sequence of a metro route in the route model library, the it is determined that the drive test data may match the metro route, and subsequent PN matching in the PN sequences is performed; otherwise, it is determined that the drive test data don't match the metro route, and the processing ends.

For example, if the PN sequence of serving cells of stations of the metro route in the route model library is PN 1, PN 2, PN 3, PN 4, . . . , PN n, the PN sequence of serving cells of sampling points in the drive test data is PN 1, PN 2, PN 1, PN 2, PN 1, PN 2, PN 3, PN 4, PN n, matching relations are as below: PN 1 and PN 2 in the PN sequence of serving cells of sampling points in the drive test data match respectively PN 1 and PN 2 in the PN sequence of serving cells of stations of the metro route in route model library; a third PN, i.e., PN 1 in the PN sequence of serving cells of sampling points in the drive test data doesn't match a third PN (PN 3) in the PN sequence of serving cells of stations of the metro route in route model library, but a subsequent PN in the PN sequence of serving cells of sampling points in the drive test data will match PN 3, and a time interval between the third PN (PN 1) and the seventh PN (PN 3) in the PN sequence of serving cells of sampling points in the drive test data is smaller than an operation time of the train traveling between the two stations, then it is determined that the drive test data may match the metro route, and subsequent PN matching in the PN sequences is performed.

It should be noted that in a practical drive test, since a train selected for the drive test has a randomness in traveling directions on a metro route, it is further required, after a PN sequence of serving cells of sampling points in the drive test data is matched with a PN sequence of serving cells of stations of each metro route in the route model library, to match the PN sequence of serving cells of sampling points in the drive test data with a reverse sequence of the PN sequence of serving cells of stations of each metro route in the route model library.

Step 304 includes that sampling points when a train parks at stations are determined.

Sampling points, where radio signal delays have an amplitude of variation smaller than a preset threshold for which the train parks, among consecutive sampling points having a same serving cell PN in the drive test data, are determined as the sampling points when the train parks at stations.

The consecutive sampling points having a same PN are sampling points corresponding to a same serving cell.

Specifically, among the consecutive sampling points having a same serving cell PN, sampling points during the parking time of the train are selected sequentially and processing below is performed: a minimum radio signal delay of the sampling points during the parking time of the train is selected as a reference value, differences between the reference value and radio signal delays of other sampling points during the parking time of the train are calculated as amplitudes of variation of radio signal delays of the other sampling points during the parking time of the train.

Specifically, due to factors such as environment variations and measurement accuracy, the radio signal delays of the sampling points are random to a certain extent, to overcome this problem, for sampling points whose radio signal delays having a relatively great amplitude of variation, in the drive test data, radio signal delays of a predetermined number of adjacent sampling points to them are averaged, and then the average value is taken as the radio signal delay of the sampling points whose radio signal delays having a relatively great amplitude of variation to reduce impact of random fluctuations on the radio signal delays.

Step 305 includes that longitudes and latitudes of the sampling points when a train parks at stations are determined.

A PN sequence of serving cells of stations in the route model library is matched with a PN sequence of serving cells of the sampling points when a train parks at stations, longitudes and latitudes of stations where PNs in the route module library match with PNs of the serving cells of the sampling points when a train parks at stations are determined as longitudes and latitudes of the sampling points when a train parks at stations.

Step 306 includes that longitudes and latitudes of sampling points when a train is moving are determined.

The sampling points when a train is moving between the sampling points when a train parks at stations are mapped to a metro route trajectory diagram between stations matching the sampling points when a train parks at stations, and longitudes and latitudes of the sampling points when a train is moving are determined.

Specifically, the step that the sampling points when a train is moving between the sampling points when a train parks at stations are mapped to a metro route trajectory diagram between stations matching the sampling points when a train parks at stations, includes:

the sampling points when a train is moving between the sampling points when a train parks at stations are mapped, in a equally-spaced way, to the metro route trajectory diagram between stations matching the sampling points when a train parks at stations; or the sampling points when a train is moving between the sampling points when a train parks at stations are mapped, in proportion, to the metro route trajectory diagram between stations matching the sampling points when a train parks at stations and the proportion is a proportion of amplitudes of variation of the radio signal delays of sampling points between the sampling points when a train parks at stations.

By means of the above steps, it is possible to determine longitudes and latitudes of sampling points, and when being combined with wireless network parameters of the sampling points in the drive test data, a drive test trajectory diagram of a metro route corresponding to the drive test data can be generated.

It should be noted that the above technical solutions also applied to other types of networks, for example, on a metro route covered by a Universal Mobile Telecommunications System (UMTS) network, longitudes and latitudes of sampling points in drive test data can be determined by substitution of PNs in steps 301-306 by Primary Scramble Codes (PSCs). Corresponding to step 301, the PSCs are acquired through parsing of drive test data.

What described are merely preferable embodiments of the present disclosure, and are not intended to limit the present disclosure.

The invention claimed is:

1. A positioning method for a drive test, applied to positioning in a drive test for rail transit, the method comprising:
    determining fixed parking sampling points of a testing vehicle in drive test data, wherein the determining fixed parking sampling points of a testing vehicle in drive test data comprising determining sampling points, where radio delays have an amplitude of variation smaller than a pre-set threshold, among consecutive sampling points having same serving cell identification information in drive test data, as a fixed parking sampling points of a testing vehicle, wherein the drive test data further include radio signal delays of the sampling points, and the radio signal delays are a measurement of time taken by radio signals transmitted from a serving cell base station to the testing vehicle, and reflects the distance between the testing vehicle and the serving cell base station;
    determining location information of the fixed parking sampling points of the testing vehicle according to serving cell identification information of the fixed parking sampling points of the testing vehicle in the drive test data and information of a route matching the drive test data; and
    determining location information of a moving sampling point between the fixed parking sampling points of the testing vehicle in the drive test data according to the information of the route,
    wherein the determining location information of the fixed parking sampling points of the testing vehicle in the drive test data according to the information of the route comprises:
    matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

2. The method according to claim 1, further comprising: before the determining fixed parking sampling points of a testing vehicle in drive test data,
    determining the route matching the drive test data according to the serving cell identification information in the drive test data.

3. The method according to claim 2, wherein the determining the route matching the drive test data according to the serving cell identification information in the drive test data comprises:
    determining a route, where a serving cell identification sequence of fixed parking points matches a serving cell identification sequence in the drive test data, as the route matching the drive test data.

4. The method according to claim 3, wherein the determining location information of the fixed parking sampling points of the testing vehicle in the drive test data according to the information of the route comprises:
    matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

5. The method according to claim 2, wherein the determining location information of the fixed parking sampling points of the testing vehicle in the drive test data according to the information of the route comprises:
    matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

6. The method according to claim 1, wherein the determining location information of a moving sampling point between the fixed parking sampling points of the testing vehicle in the drive test data according to the information of the route comprises:
    mapping the moving sampling point between the fixed parking sampling points of the testing vehicle to a route segment of the route between fixed parking points matching the fixed parking sampling points of the testing vehicle, and determining the location information of the moving sampling point according to location information of the route segment in the information of the route.

7. The method according to claim 6, wherein the mapping the moving sampling point between the fixed parking sampling points of the testing vehicle to a route segment of the route between fixed parking points matching the fixed parking sampling points of the testing vehicle comprises:
mapping, in an equally-spaced way, the moving sampling point between the fixed parking sampling points of the testing vehicle to the route segment of the route between the fixed parking points matching the fixed parking sampling points of the testing vehicle; or
mapping, in proportion, the moving sampling point between the fixed parking sampling points of the testing vehicle to the route segment of the route between the fixed parking points matching the fixed parking sampling points of the testing vehicle.

8. A positioning device for a drive test, applied to positioning in a drive test for rail transit, the positioning device for a drive test comprising:
a memory storing executable instructions; and
a processor configured to be capable of executing the stored executable instructions to perform steps comprising:
determining fixed parking sampling points of a testing vehicle in drive test data, wherein the determining fixed parking sampling points of a testing vehicle in drive test data comprising determining sampling points, where radio delays have an amplitude of variation smaller than a pre-set threshold, among consecutive sampling points having same serving cell identification information in drive test data, as a fixed parking sampling points of a testing vehicle, wherein the drive test data further include radio signal delays of the sampling points, and the radio signal delays are a measurement of time taken by radio signals transmitted from a serving cell base station to the testing vehicle, and reflects the distance between the testing vehicle and the serving cell base station;
determining location information of the fixed parking sampling points of the testing vehicle according to serving cell identification information of the fixed parking sampling points of the testing vehicle in the drive test data and information of a route matching the drive test data; and
determining location information of a moving sampling point between the fixed parking sampling points of the testing vehicle in the drive test data according to the information of the route,
wherein the processor is further configured to be capable of executing the stored executable instructions to perform steps further comprising: matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

9. The positioning device for a drive test according to claim 8, wherein the processor is further configured to be capable of executing the stored executable instructions to perform steps further comprising:
determining the route matching the drive test data according to the serving cell identification information in the drive test data.

10. The positioning device for a drive test according to claim 9, wherein the processor is further configured to be capable of executing the stored executable instructions to perform steps further comprising: determining a route, where a serving cell identification sequence of fixed parking points matches a serving cell identification sequence in the drive test data, as the route matching the drive test data.

11. The positioning device for a drive test according to claim 10, wherein the processor is further configured to be capable of executing the stored executable instructions to perform steps further comprising: matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

12. The positioning device for a drive test according to claim 9, wherein the processor is further configured to be capable of executing the stored executable instructions to perform steps further comprising: matching a serving cell identification sequence of fixed parking points in the information of the route with a serving cell identification sequence of the fixed parking sampling points of the testing vehicle in the drive test data, and determining location information of the fixed parking points in the information of the route matching the fixed parking sampling points of the testing vehicle in the drive test data, as the location information of the fixed parking sampling points of the testing vehicle in the drive test data.

13. The positioning device for a drive test according to claim 8, wherein the processor is further configured to be capable of executing the stored executable instructions to perform steps further comprising: mapping the moving sampling point between the fixed parking sampling points of the testing vehicle to a route segment of the route between fixed parking points matching the fixed parking sampling points of the testing vehicle, and determining the location information of the moving sampling point according to location information of the route segment in the information of the route.

14. The positioning device for a drive test according to claim 13, wherein the processor is further configured to be capable of executing the stored executable instructions to perform steps further comprising:
mapping, in an equally-spaced way, the moving sampling point between the fixed parking sampling points of the testing vehicle to the route segment of the route between the fixed parking points matching the fixed parking sampling points of the testing vehicle; or
mapping, in proportion, the moving sampling point between the fixed parking sampling points of the testing vehicle to the route segment of the route between the fixed parking points matching the fixed parking sampling points of the testing vehicle.

* * * * *